(12) United States Patent
Bao

(10) Patent No.: US 11,350,469 B2
(45) Date of Patent: May 31, 2022

(54) TAP TO BROADCAST SPEAKER PAIRING

(71) Applicant: ZAGG INC, Midvale, UT (US)

(72) Inventor: Christian Bao, Orem, UT (US)

(73) Assignee: ZAGG INC, Midvale, UT (US)

(*) Notice: Subject to any disclaimer, the term of this patent is extended or adjusted under 35 U.S.C. 154(b) by 343 days.

(21) Appl. No.: 16/724,912

(22) Filed: Dec. 23, 2019

(65) Prior Publication Data

US 2020/0221519 A1 Jul. 9, 2020

Related U.S. Application Data

(60) Provisional application No. 62/790,072, filed on Jan. 9, 2019.

(51) Int. Cl.
*H04W 76/14* (2018.01)
*H04R 1/02* (2006.01)
*H04R 3/12* (2006.01)

(52) U.S. Cl.
CPC ............ *H04W 76/14* (2018.02); *H04R 1/025* (2013.01); *H04R 3/12* (2013.01); *H04R 2420/07* (2013.01)

(58) Field of Classification Search
CPC ...... H04L 29/06; H04L 12/801; H04W 56/00; H04W 4/80; H04W 76/14; H04R 3/12
See application file for complete search history.

(56) References Cited

U.S. PATENT DOCUMENTS

| | | |
|---|---|---|
| 9,246,555 B2 | 1/2016 | Griffin et al. |
| 2015/0126109 A1 | 5/2015 | Keshavdas et al. |
| 2016/0062484 A1* | 3/2016 | Sugiura ................. G06F 3/0202 345/156 |
| 2018/0052649 A1* | 2/2018 | Patel ....................... H02J 50/40 |
| 2018/0139597 A1* | 5/2018 | Labrosse .............. H04B 5/0031 |

* cited by examiner

*Primary Examiner* — Iqbal Zaidi
(74) *Attorney, Agent, or Firm* — Thorpe, North & Western, LLP

(57) ABSTRACT

A wireless speaker system for broadcast pairing multiple wireless speakers together. The wireless speakers are equipped with magnets and magnet sensors so that taping the speakers together, at a location with the magnets and sensors meet, causes a wireless speaker to enter into a broadcast pairing mode. The magnet and sensor in each wireless speaker can be a combined magnet and sensor, or magnet-sensor combo. The magnet and the sensor can be carried by a common carrier or mount. The combined magnet and sensor can comprise a central magnet surrounded by an annular array of magnet sensors.

18 Claims, 5 Drawing Sheets

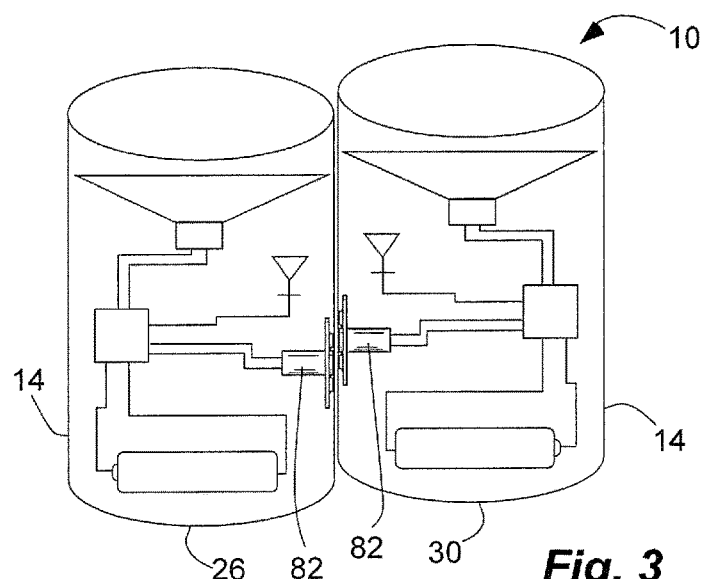
Fig. 3
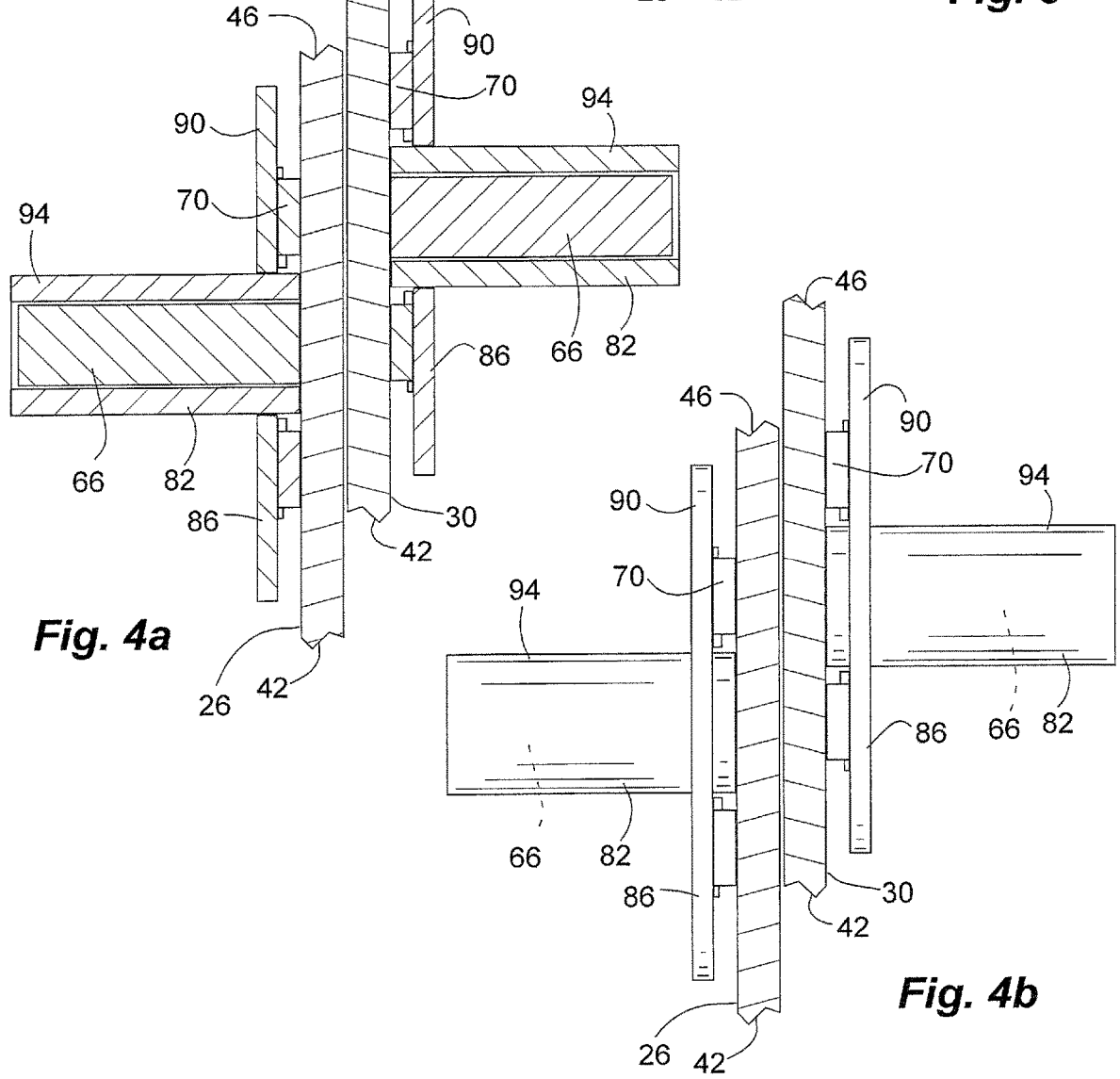
Fig. 4a
Fig. 4b

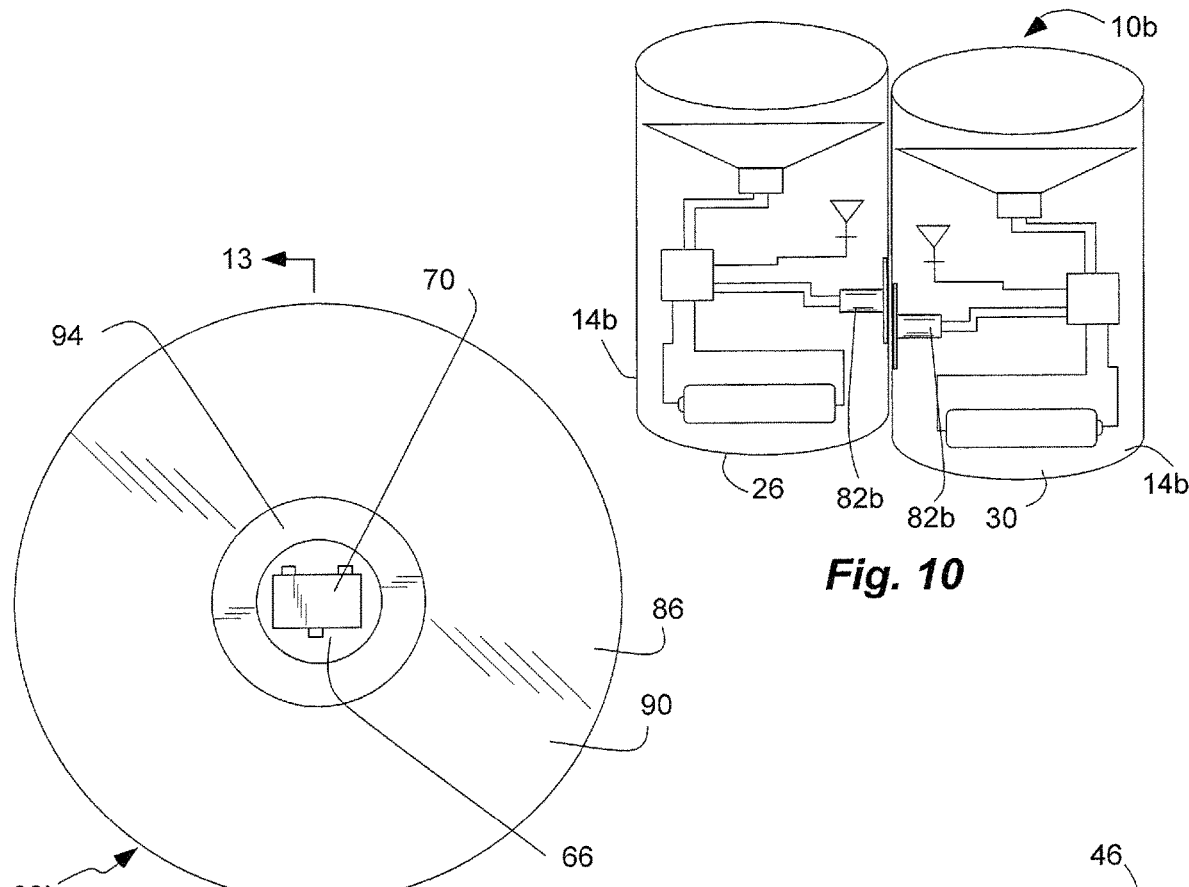
Fig. 10
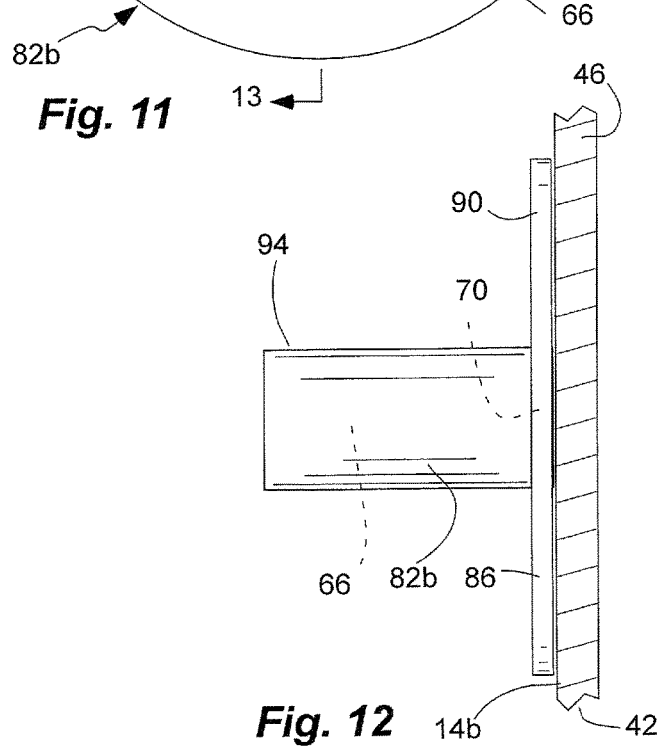
Fig. 11
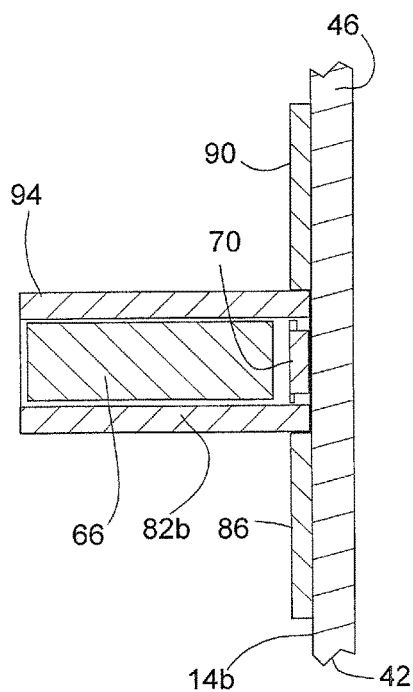
Fig. 12
Fig. 13

TAP TO BROADCAST SPEAKER PAIRING

PRIORITY CLAIM

Priority is claimed to U.S. Provisional Patent Application Ser. No. 62/790,072, filed Jan. 9, 2019, which hereby incorporated herein by reference.

BACKGROUND

A separate wireless Bluetooth speaker can be paired with a cell phone to transmit music from the cell phone to the speaker and play music from the speaker. The speaker provides a larger speaker with respect to the cell phone, and an independent power source in order to play the music loud enough for a group of people. Pairing the speaker with the cell phone can be tedious and confusing, and often involves uncertain pushing of a button on the speaker to achieve a pairing mode, the transmission and acceptance of a pass code to and with the cell phone, and even fumbling with cell phone communication settings. Near field communication (NFC) chip sets in the cell phone and the speaker can be positioned proximate to one another to facilitate pairing. Pairing speakers together has been proposed for even greater sound distribution, but can still require cryptic or non-intuitive button pushing and speaker positioning.

The classic Bluetooth connection involves a source device (like a phone) and a single sink device (in this case, the Bluetooth enabled speaker). Broadcast technologies expand this setup to multiple sink devices, so the same music from the phone plays synchronously in multiple compatible Bluetooth speakers. Because the music needs to play synchronously between all the connected speakers, they need initial setup, or in other words, they need to be paired to the Broadcast group. The pairing process between the master speaker (the speaker connected to the phone) and the slave speakers can be quite cumbersome, as each device needs to enter a broadcast pairing mode as a master speaker or as a slave speaker. Other methods that have been used to establish this connection include phone apps, several different buttons on the speaker to identify the event, and special button combinations. All these methods add complexity to the device, making it harder for the average user to want to use the feature.

The development of user-friendly speaker pairing is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3 is a schematic view of a pair of wireless speakers of the wireless speaker system of FIG. 1, namely a master speaker and a slave speaker, being placed adjacent one another to trigger broadcast pairing between the pair of wireless speakers.

FIG. 4a is a cross-sectional, detailed schematic view of a combined magnet and sensor of each speaker of the pair of wireless speakers of FIG. 3, showing in proximity to one another to trigger broadcast pairing.

FIG. 4b is a detailed side schematic view of the combined magnet and sensor of each speaker the pair of wireless speakers of FIG. 3, showing in proximity to one another to trigger broadcast pairing.

FIG. 10 is a schematic view of another pair of wireless speakers of another wireless speaker system in accordance with another embodiment of the invention, showing a master speaker and a slave speaker, being placed adjacent one another to trigger broadcast pairing between the pair of wireless speakers.

FIG. 11 is a front view of another combined magnet and sensor of the wireless speaker in accordance with another embodiment of the invention.

FIG. 12 is a side view of the combined magnet and sensor of FIG. 11.

FIG. 13 is a cross-sectional side view of the combined magnet and sensor of FIG. 11, taken along line 13 of FIG. 11.

Figures 1, 2:
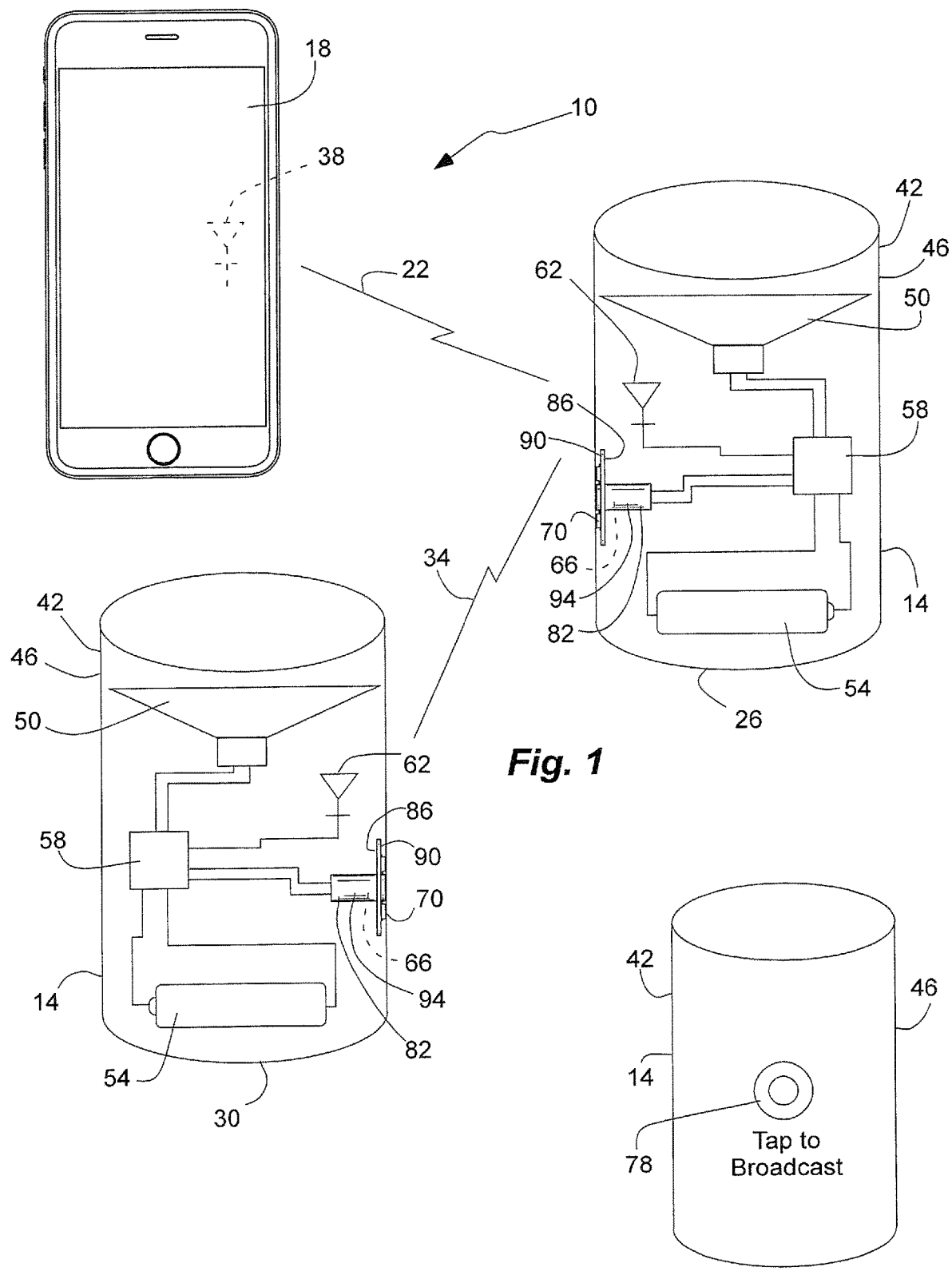
FIG. 1 is a schematic view of a wireless speaker system in accordance with an embodiment of the invention.
FIG. 2 is a schematic perspective view of a wireless speaker in accordance with an embodiment of the invention.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order.

It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, sizes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

The terms "mobile device" and "cell phone" are used interchangeably herein, unless otherwise specified, to refer to a portable handheld electronic device, such as a cellular or cell phone, tablet or tablet computer, phablet, game, and the like, with a display screen, and that is portable and handheld. The display screen can be a touch screen that can receive input by touch such as finger swipes, and/or can have a virtual keyboard. The mobile device can have a battery and memory and a processor with software running thereon. The mobile device can have cellular, WiFi and/or Bluetooth connectivity, and can have a wireless transmitter, receiver, or transceiver. Thus, the mobile device can provide internet browsing, game playing, movie and picture display, e-book display, etc. In addition, the mobile device can include a digital camera. Throughout the description, the term "cell phone" will be used as an example of the mobile device, and such use of the term "cell phone" includes all mobile devices or portable handheld electronic devices, unless otherwise specified.

The term "ferromagnetic" is used herein to refer to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic ring can be a magnet or can be magnetic, such as a permanent magnet, or is attracted to magnets, such as by containing iron.

The term "magnet" or "magnetic" is used herein to refer to a natural magnet or an electromagnet, unless otherwise specified. In one aspect, the magnet can be a rare earth magnet. In another aspect, the magnet can be a coil magnet.

Furthermore, the described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

Example Embodiments

An initial overview of technology embodiments is provided below and specific technology embodiments are then described in further detail. This initial summary is intended to aid readers in understanding the technology more quickly but is not intended to identify key or essential features of the technology nor is it intended to limit the scope of the claimed subject matter.

The invention presents a wireless speaker system and method for broadcast pairing multiple wireless speakers together. The system can comprise multiple wireless speakers equipped with magnets and magnet sensors so that touching or taping the speakers together, at a location where the magnets and sensors meet, causes a wireless speaker to enter into a broadcast pairing mode. Simply touching one speaker to the other causes the sensor in one speaker to sense the magnet of the other speaker.

One of the wireless speakers can be a master speaker that is paired, such as through Bluetooth, to an audio source, such as a cell phone. The remaining wireless speakers can be slave speakers paired to the master speaker. The master speaker can receive an audio signal from the audio source or cell phone, while the slave speakers can receive the audio signal from the master speaker. The audio signal from the master speaker can also comprise synchronizing information.

The magnet and the sensor in each wireless speaker can be a combined magnet and sensor, or magnet-sensor combo. The magnet and the sensor can be carried by a common carrier or mount, and can be bundled together. Thus, the combined magnet and sensor can be commonly located in proximity to one another to allow for sensing and pairing within 360 degree planar orientation.

The combined magnet and sensor can comprise a central magnet surrounded by an annular array of magnet sensors. In addition, the magnets can be commonly oriented with respect to an outer wall of the speaker, e.g. similar polarity at the wall. Thus, when a pair of magnets of a pair of speaker are brought into proximity with one another in alignment, the magnetic fields repeal the magnets, causing lateral displacement and misalignment of the magnets, but aliment of the magnets with one of the sensors in the array of magnetic sensors.

Referring to FIGS. 1-9, a wireless speaker system 10 with multiple wireless speakers 14 is shown in an exemplary embodiment of the present invention for use with an audio source 18 to provide audio, such as music, to multiple users in a relatively large area or space. The audio source 18 can be a mobile device, such as a cell phone, capable of providing an audio signal, represented by 22. The audio signal 22 can be provided by a Bluetooth connection between the audio source 18 and one of the wireless speaker 14, defining a master speaker 26. The remaining wireless speakers 14 can be slave speakers 30 that can receive the audio signal, represented at 34, from the master speaker 26. Placing a pair of wireless speakers 14 in proximity to one another, or tapping them together, causes a sensors in the speakers 14 to sense a change in magnetic field, with in turn, triggers an event on the speaker(s) 14, such as broadcast pairing, as described in greater detail below. Thus, a pair of wireless speakers 14 can be wirelessly coupled to the audio source 18 to wirelessly receive the audio signal 22.

The audio source 18 can be a cell or cellular phone. The audio source 18 can have a transceiver 38, i.e. a transmitter and/or a receiver, such as an antenna. In one aspect, the audio source 18 can have an internal memory device with audio or music files stored thereon. In another aspect, the audio source 18 can be capable of coupling to the internet and/or a cloud storage device to receive audio or music files stored thereon. The audio source 18 can be capable of connecting or pairing with the master speaker 26, such as via a Bluetooth connection, e.g. Advanced Audio Distribution Profile (A2DP). The pairing causes the audio source 18 to send the audio signal 22, and allows the master speaker 26 to receive the audio signal 22.

The wireless speaker 14 can comprise a housing 42 with a housing wall 46. The housing wall 46 can substantially envelope the housing 42. The housing 42 and the housing wall 46 can be formed of plastic and can be formed by injection molding. The housing 42 can have openings in the housing wall 46, such as a grill, to allow sound to emanate from the housing 42. In one aspect, the housing 42 can further comprise a covering to cover the opening in the housing wall 46. The wireless speaker 14 and the housing 42 can be sized and shaped to be hand-held and portable.

A speaker 50 is carried by the housing 42 and can be contained therein. The speaker 50 can produce audio and audible sound. A power source 54 can be carried by the housing 42 and coupled to the speaker 50. In one aspect, the power source 54 can comprise a rechargeable battery. In another aspect, the power source 54 can be an electrical power cord. Control electronics 58 are carried by the housing 42. The control electronics 58 can comprise a printed circuit board (CPU) with central processing unit (CPU), one or more amplifiers, etc. In addition, the control electronics 58 can comprise a receiver 62 to receive the audio signal 22 and/or 34. In one aspect, the receiver 62 can be a transceiver, or a transmitter and a receiver. The receiver 62 can be an antenna. Thus, the wireless speakers 14 can be wireless because they received a radio signal with the audio signal 22 and 34, without a wire. Although the wireless speakers 14 can operate on battery power, they can also operate with a wired power cord.

In addition, the wireless speaker 14 can have a magnet 66 and a magnetic sensor 70 carried by, and located in, the housing 42. The magnet 66 and the magnetic sensor 70 can be positioned adjacent the housing wall 46, such as being placed against an inside of the housing wall 46. In addition, the magnet 66 and the magnetic sensor 70 can be oriented to face outwardly so that the magnets 66 of two wireless speakers 14 oppose one another through the housing walls 46. The magnet 66 has a magnetic field, represented at 74 in FIGS. 5a and 5b, that extends beyond the housing wall 46 to outside of the housing 42 and the wireless speaker 14. The magnetic sensor 70 can be positioned to sense another magnetic field 74 from another magnet 66 of another wireless speaker 14 outside the housing wall 46 when the speakers 14, and thus the magnets 66 and the sensors 70, are in proximity to one another. In one aspect, the magnetic sensor 70 can comprise multiple magnetic sensors. In another aspect, the magnetic sensor 70 can comprise a Hall Effect sensor. The magnetic sensor 70 can be coupled to the control electronics 58. In another aspect, the magnet 66 and the magnetic sensor 70 can be positioned adjacent one another to create a common activation zone or area on the surface of the housing 42 or the housing wall 46 of the wireless speaker 14. The common activation zone can be marked with indicium or indicia 78 on an exterior surface of the housing 42 or the housing wall 46. Thus, two wireless speakers 14 can be paired by matching or tapping their indicia 78 together.

In one aspect, the magnet 66 and the magnetic sensor 70 can be a combined magnet and sensor 82, such as a magnet-sensor combo, that is similarly carried by the housing 42, and positioned adjacent the housing wall 46, and oriented to face outwardly. The combined magnet and sensor 82 can have a common carrier 86, such as a mount, carried by the housing 42 and the housing wall 46, with both the magnet 66 and the magnetic sensor 70 coupled to, and carried by, the common carrier 86. In one aspect, the common carrier 86 can be ferromagnetic, or formed of a ferrous material, as discussed below.

The magnet 66 and the magnetic sensor 70 coupled to the common carrier 86 can define the combined magnet and sensor 82. Both the magnet 66 and the magnetic sensor 70 share the common carrier 86 and mount, so that they are bundled together as a single unit that is positionable together with respect to the housing 42. In addition, the common carrier 86 can position the magnet 66 and the magnetic sensor 70 adjacent one another in the activation zone.

The combined magnet and sensor 82, and/or the common carrier 86, can comprise a ferromagnetic ring 90 that circumscribes the magnet 66. The ring 90 can be made of metal, such as a ferrous metal. In one aspect, the ring 90 can be located at a proximal end of the magnet 66, and can be located adjacent the housing wall 46. In another aspect, the ring 90 can be spaced-apart from the proximal end of the magnet 66. In one aspect, the ring 90 may enhance and/or focus the magnetic field 74 of the magnet 66. In another aspect, to the ring 90 may enhance and/or focus another magnetic field 74 of another magnet 66 for the sensor 70.

In addition, the combined magnet and sensor 82, and/or the common carrier 86, can further comprise a ferromagnetic tube 94. The tube 94 can be made of metal, such as a ferrous metal. The magnet 66 can be located in the tube 94, and the tube 94 can carry the magnet 66. The tube 94 and the ring 90 can be coupled together to form and define the common carrier 86, and couple the magnet 66 and the magnetic sensor 70. In one aspect, the ring 90 can be spaced-apart from the proximal end of the tube 94, forming an annular gap 98 (FIG. 8) between the ring 90 and the housing wall 46.

Furthermore, the magnetic sensor 70 can comprise a ring or annular array of magnetic sensors 102. The array of sensors 102 can be carried by the ring 90, and can circumscribe the tube 94 and the magnet 66. In addition, the array or sensors 102 can be located in the gap 98 between housing wall 46 and the ring 90.

As described above, multiple slave speakers 30 can be paired with the master speaker 26. Thus, a pair of wireless speakers 14 can be paired, with one being a master speaker 26 to be coupled to the audio source 18, and the other being the slave speaker 30 to be wirelessly coupled to the master speaker 26. To pair the wireless speakers 14, or to pair the slave speaker 30 to the master speaker 26, the speakers 26 and 30 are positioned adjacent one another with the common activation zone and the indicia 78, and thus the combined magnet and sensor 82 of each of the pair of wireless speakers 14, positioned adjacent one another and in proximity to one another. The combined magnet and senor 82 of each speaker 26 and 30 can face one another through the housing walls 46. In one aspect, the wireless speakers 26 and 30, and the common activation zone and the indicia 78 thereof, can be tapped together. The magnetic sensor(s) 70 of the slave speaker 30 senses the change in magnetic field, which causes the slave speaker 30 to enter a pairing mode or to initiate broadcast pairing with the master speaker 26. Thus, the tapping and proximity of the magnets 66 and sensors 70 trigger a pairing mode and a communication protocol.

Figure 5A:
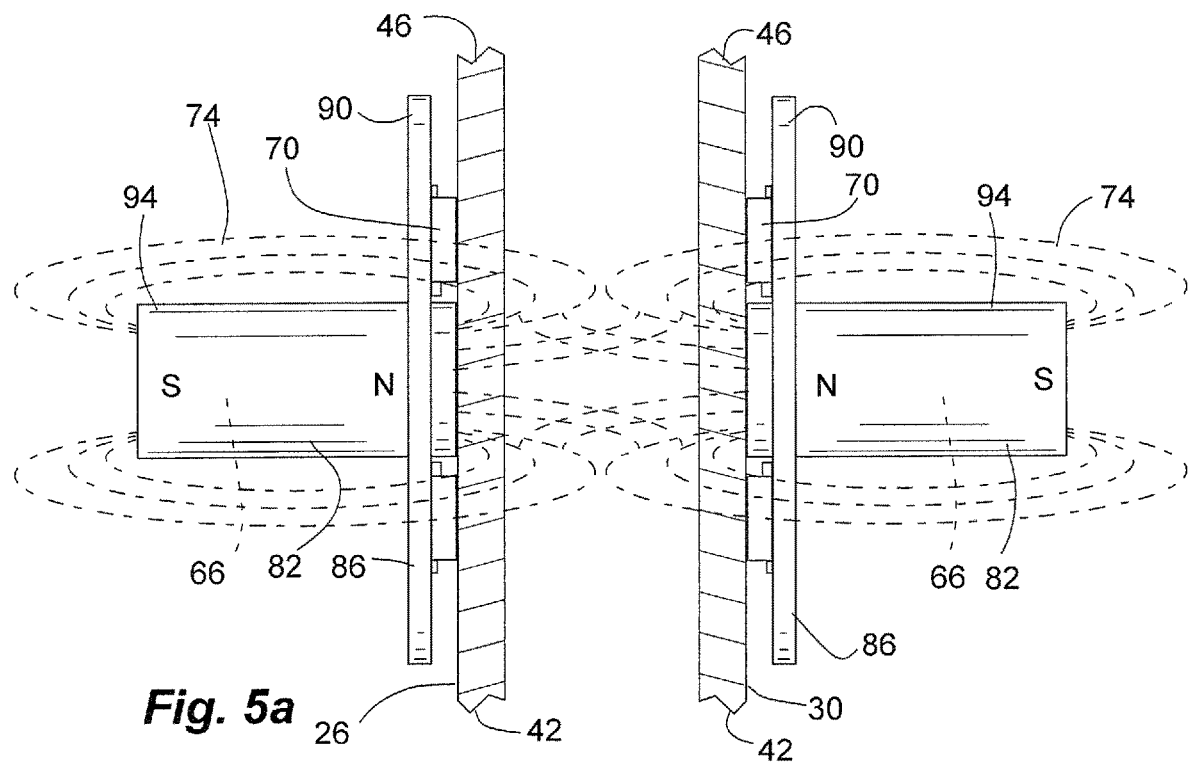
FIG. 5a is a detailed side schematic view of the combined magnet and sensor of each speaker the pair of wireless speakers of FIG. 3, shown in alignment with one another and illustrating a resistive magnetic force. (Polarity of the magnet is shown by way of example.)
Figure 5B:
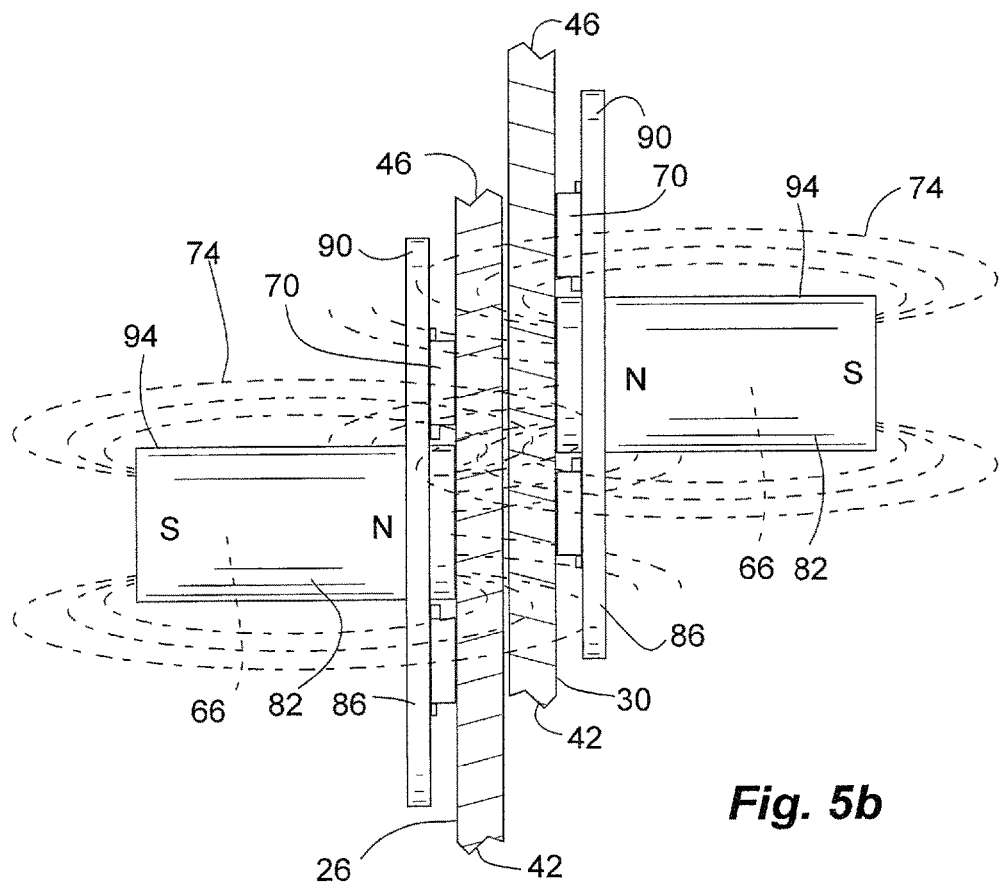
FIG. 5b is a detailed side schematic view of the combined magnet and sensor of each speaker the pair of wireless speakers of FIG. 3, shown in proximity to one another to trigger broadcast pairing. (Polarity of the magnet is shown by way of example.)
Figure 6:
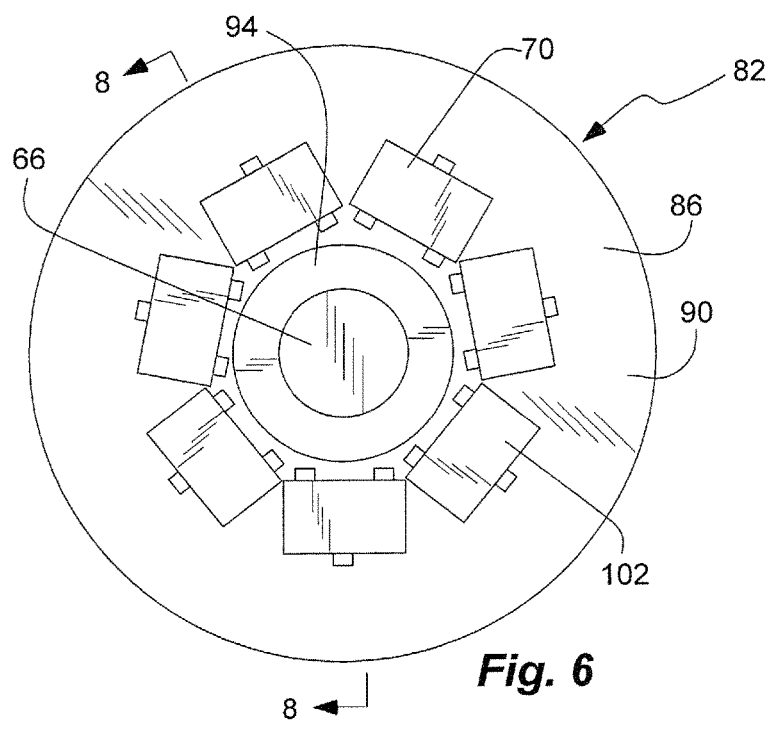
FIG. 6 is a front view of the combined magnet and sensor of the wireless speaker of FIGS. 1 and 2 in accordance with an embodiment of the invention.
Figure 8:
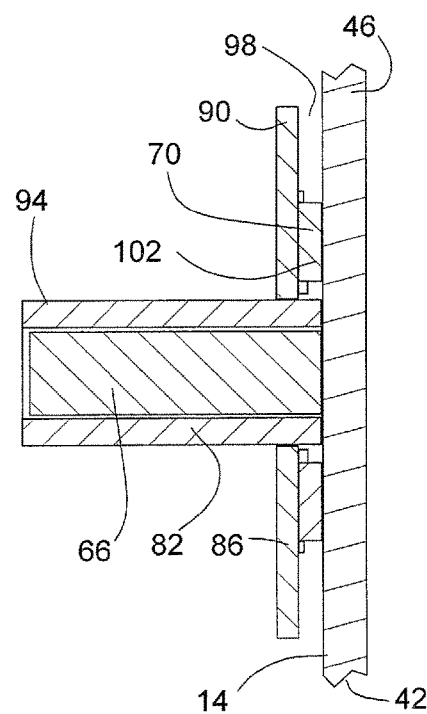
FIG. 8 is a cross-sectional side view of the combined magnet and sensor of FIG. 6, taken along line 8 of FIG. 6.
Figure 7:
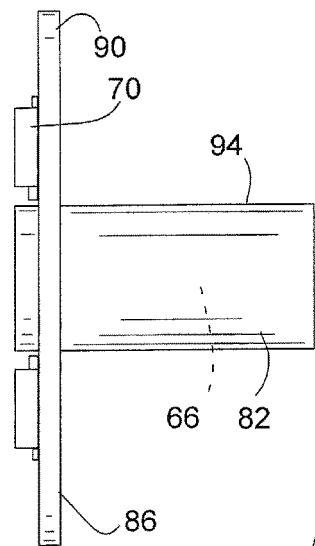
FIG. 7 is a side view of the combined magnet and sensor of FIG. 6.
Figure 9:
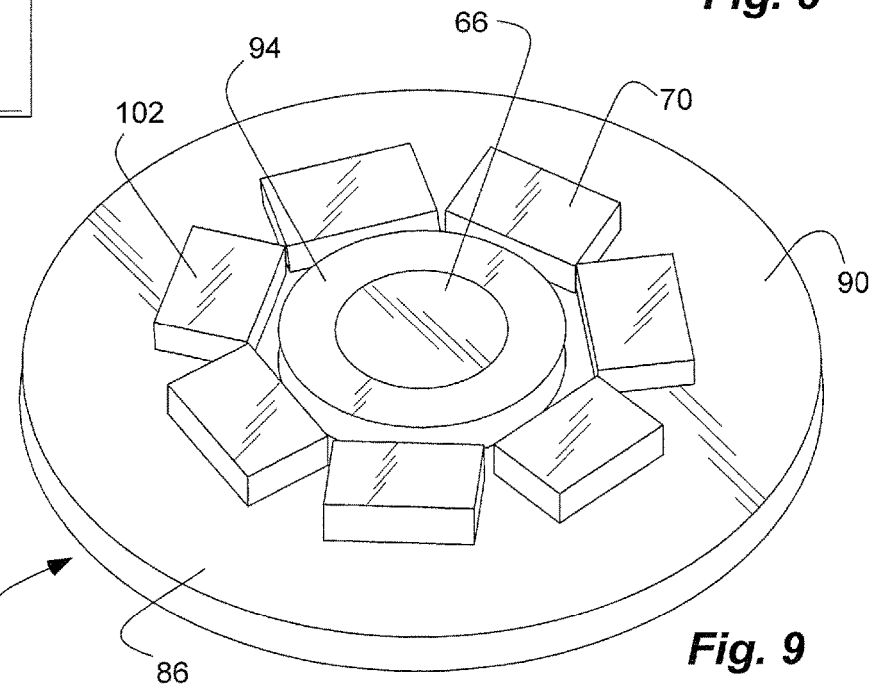
FIG. 9 is a perspective view of the combined magnet and sensor of FIG. 6.

In another aspect, each magnet 66 can be commonly aligned with the same polarity with respect to the housing wall 46. Thus, the magnetic fields 74 oppose one another when the magnets 66 are in proximity. When placing the magnets 66 in alignment with one another, as shown in FIG. 5a, the magnetic fields 74 bias the magnets away from one another, and laterally out of alignment with one another. In addition, the magnetic fields 74 can bias the magnetic sensors 70 into alignment with the magnets 66, as shown in FIG. 5b.

A method for broadcasting music with the wireless speaker system 10 described above comprises: 1) establishing a wireless connection between a cellular phone 18 and a first of the pair of wireless speakers 14, defining a master speaker 26, the wireless connection comprising an audio signal 22 from the cellular phone 18 to the master speaker 26; and 2) positioning a second of the pair of wireless speakers 14, defining a slave speaker 30, adjacent the master speaker 26, with the combined magnet and sensor 82 of the slave speaker 30 in proximity to the combined magnet and sensor 82 of the master speaker 26, causing the slave speaker 30 to enter a pairing mode with the master speaker 26 and receive the audio signal 34. The method can further comprise activating the master speaker 26 and/or the slave speaker 30 to enter into the broadcast pairing mode. For example, a button on the master speaker 26 and/or the slave speaker 30 may be pushed prior to tapping the speakers 26 and 30 together.

Referring to FIGS. 10-13, another combined magnet and sensor 82b is show that is similar in many respects to those described above, and which description is hereby incorporated herein by reference. The combined magnet and sensor 82b can be used in a wireless speaker 14b and a wireless speaker system 10b. The magnet 66 and the magnetic sensor 70 can be axially aligned and stacked with the magnetic sensor 70 at a proximal end of the magnet 66. Both the magnet 66 and the magnetic sensor 70 can be positioned in the tube 94.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A method for broadcasting music with a wireless speaker system comprising:
    a pair of wireless speakers configured to be wirelessly coupled to an audio source and wirelessly receive an audio signal from the audio source, each of the pair of wireless speakers comprising:
    a housing comprising a housing wall;
    a speaker carried by the housing and configured to produce audio;
    a power source carried by the housing and coupled to the speaker;
    control electronics carried by the housing and comprising a receiver configured to receive the audio signal; and
    a combined magnet and sensor carried by the housing and positioned adjacent the housing wall and oriented to face outwardly, the combined magnet and sensor comprising a magnet with a magnetic field configured to extend beyond the housing wall, and a magnetic sensor positioned adjacent the magnet and configured to sense another magnetic field from outside the housing wall; and
    the method comprising:
    establishing a wireless connection between the audio source and a first of the pair of wireless speakers, defining a master speaker, the wireless connection comprising an audio signal from the audio source to the master speaker; and
    positioning a second of the pair of wireless speakers, defining a slave speaker, adjacent the master speaker, with the combined magnet and sensor of the slave speaker in proximity to the combined magnet and sensor of the master speaker, causing the slave speaker to enter a pairing mode with the master speaker and receive the audio signal.

2. The method of claim 1, wherein each of the wireless speakers further comprises:
    a common carrier carried by the housing with both the magnet and the magnetic sensor coupled to the common carrier, and defining the combined magnet and sensor.

3. The method of claim 1, wherein each combined magnet and sensor further comprises:
    a ferromagnetic ring located adjacent the housing wall and circumscribing the magnet.

4. The method of claim 1, wherein each combined magnet and sensor further comprises:
    a ring of magnetic sensors circumscribing the magnet.

5. The method of claim 4, wherein each magnet of the pair of wireless speakers is commonly aligned with respect to the housing wall of a respective wireless speaker, and is opposable with respect to the other magnet; and wherein placing the magnets in alignment with one another causes magnetic fields to bias the magnets out of alignment with one another, and into alignment between one of the magnetic sensors of one wireless speaker and the magnet of the other wireless speaker.

6. The method of claim 1, wherein each combined magnet and sensor further comprises:
    a tube comprising ferrous metal and with the magnet located in the tube;
    a ring comprising ferrous metal and circumscribing the tube and spaced-apart from a proximal end of the tube adjacent to the housing wall;
    a ring of magnetic sensors carried by the ring and circumscribing the tube and the magnet.

7. A wireless speaker system comprising:
    a pair of wireless speakers configured to be wirelessly coupled to an audio source and wirelessly receive an audio signal from the audio source, each of the pair of wireless speakers comprising:
    a housing comprising a housing wall;
    a speaker carried by the housing and configured to produce audio;
    a power source carried by the housing and coupled to the speaker;
    control electronics carried by the housing and coupled to the speaker, and comprising a receiver configured to receive an audio signal;
    a combined magnet and sensor carried by the housing and positioned adjacent the housing wall, the combined magnet and sensor comprising a magnet with a magnetic field configured to extend beyond the housing wall, and a ring of magnetic sensors circumscribing the magnet and configured to sense another magnetic field from outside the housing wall; and
    each of the magnets of the pair of wireless speakers being commonly aligned with respect to the housing wall of a respective wireless speaker, and are opposable with respect to one another; and wherein placing the magnets in alignment with one another causes magnetic fields to bias the magnets out of alignment with one another, and into alignment between one of the magnetic sensors of one wireless speaker and one magnet of the other wireless speaker.

8. The wireless speaker system of claim 7, wherein the pair of wireless speakers comprise: a master speaker configured to be coupled to the audio source, and a slave speaker configured to be wirelessly coupled to the master speaker; and wherein positioning the combined magnet and sensor of each of the pair of wireless speakers in proximity to one another causes the slave speaker to enter a pairing mode.

9. The wireless speaker system of claim 7, wherein the combined magnet and sensor further comprises:
    a ferromagnetic ring located adjacent the housing wall and circumscribing the magnet.

10. The wireless speaker system of claim 7, wherein the combined magnet and sensor further comprises:

a tube comprising ferrous metal and with the magnet located in the tube;
a ring comprising ferrous metal and circumscribing the tube and spaced-apart from a proximal end of the tube adjacent to the housing wall; and
the ring of magnetic sensors carried by the ring and circumscribing the tube and the magnet.

11. The wireless speaker system of claim 7, wherein each of the wireless speakers further comprises:
a common carrier carried by the housing with both the magnet and the magnetic sensor coupled to the common carrier, and defining the combined magnet and sensor.

12. A method for broadcasting music with the wireless speaker system of claim 7, the method comprising:
establishing a wireless connection between a cellular phone and a first of the pair of wireless speakers, defining a master speaker, the wireless connection comprising an audio signal from the cellular phone to the master speaker; and
positioning a second of the pair of wireless speakers, defining a slave speaker, adjacent the master speaker, with the combined magnet and sensor of the slave speaker in proximity to the combined magnet and sensor of the master speaker, causing the slave speaker to enter a pairing mode with the master speaker and receive the audio signal.

13. A wireless speaker comprising:
a housing comprising a housing wall;
a speaker carried by the housing and configured to produce audio;
a power source carried by the housing and coupled to the speaker;
control electronics carried by the housing and coupled to the speaker, and comprising a receiver configured to receive an audio signal;
a magnet carried by the housing and positioned adjacent the housing wall, the magnet having a magnetic field configured to extend beyond the housing wall;
a tube comprising ferrous metal and with the magnet located in the tube;
a ring comprising ferrous metal and circumscribing the tube and spaced-apart from a proximal end of the tube adjacent to the housing wall; and
an annular array of magnetic sensors carried by the housing and circumscribing the tube and the magnet.

14. The wireless speaker of claim 13, wherein:
the annular array of magnetic sensors is positionable adjacent to another magnet of another wireless speaker with another magnetic field sensible by the annular array of magnetic sensors to initiate broadcast pairing between the wireless speakers.

15. The wireless speaker of claim 13, further comprising a pair of wireless speakers comprising: each of the magnets of the pair of wireless speakers being commonly aligned with respect to the housing wall of a respective wireless speaker, and are opposable with respect to one another; and wherein placing the magnets in alignment with one another causes magnetic fields to bias the magnets out of alignment with one another, and into alignment between one of the magnetic sensors of one wireless speaker and one magnet of the other wireless speaker.

16. A method for broadcasting music with the wireless speaker system of claim 15, the method comprising:
establishing a wireless connection between a cellular phone and a first of the pair of wireless speakers, defining a master speaker, the wireless connection comprising an audio signal from the cellular phone to the master speaker; and
positioning a second of the pair of wireless speakers, defining a slave speaker, adjacent the master speaker, with the combined magnet and sensor of the slave speaker in proximity to the combined magnet and sensor of the master speaker, causing the slave speaker to enter a pairing mode with the master speaker and receive the audio signal.

17. The wireless speaker of claim 13, further comprising:
a ferromagnetic ring located adjacent the housing wall and circumscribing the magnet.

18. The wireless speaker of claim 13, further comprising:
a common carrier carried by the housing with both the magnet and the magnetic sensor coupled to the common carrier.

* * * * *